UNITED STATES PATENT OFFICE.

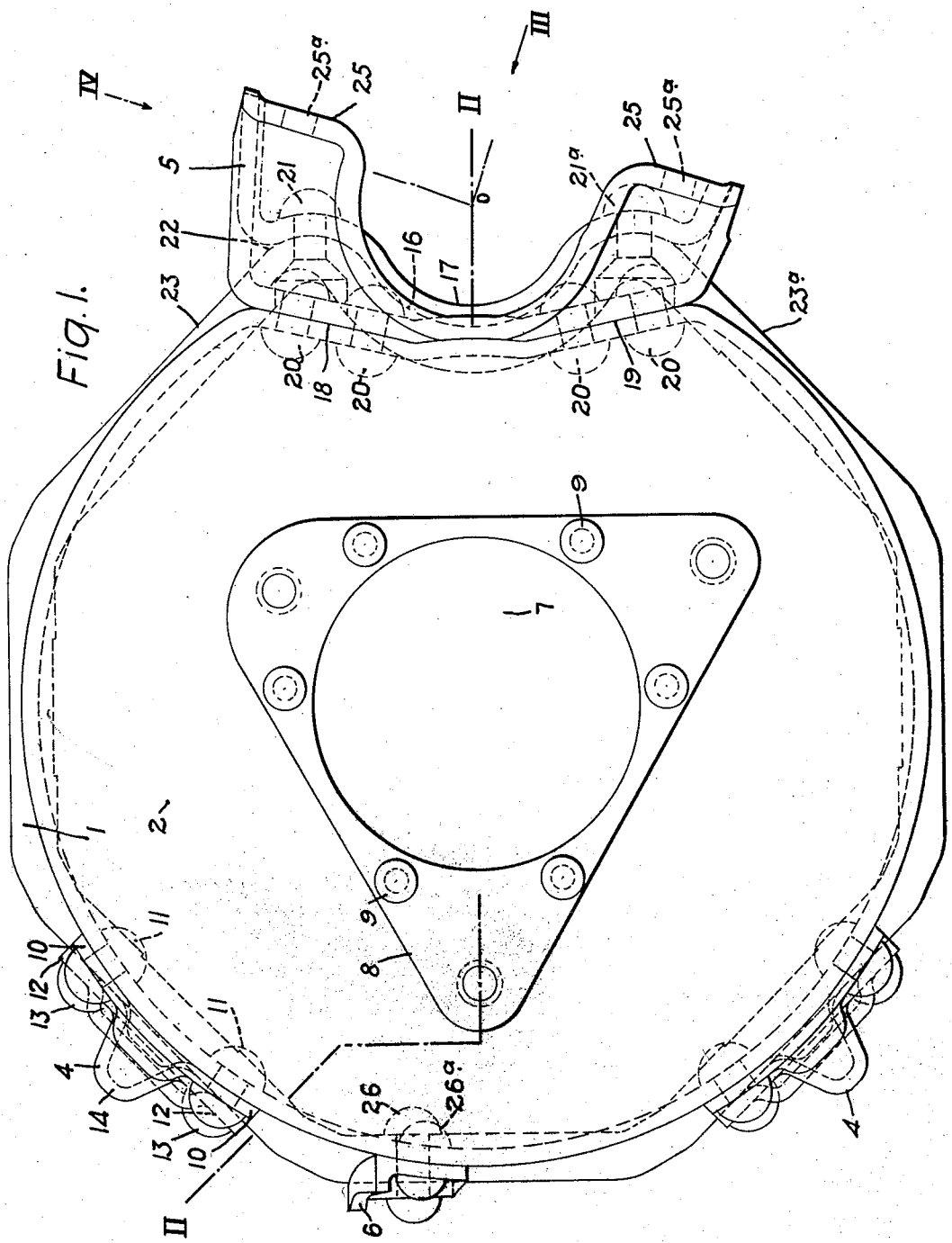

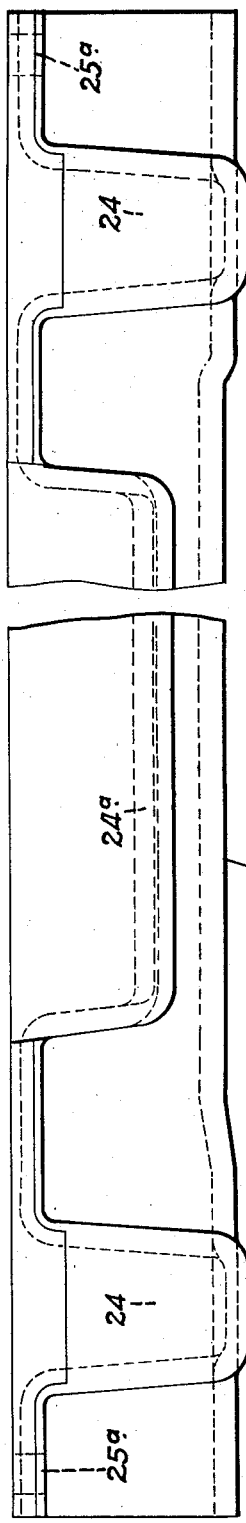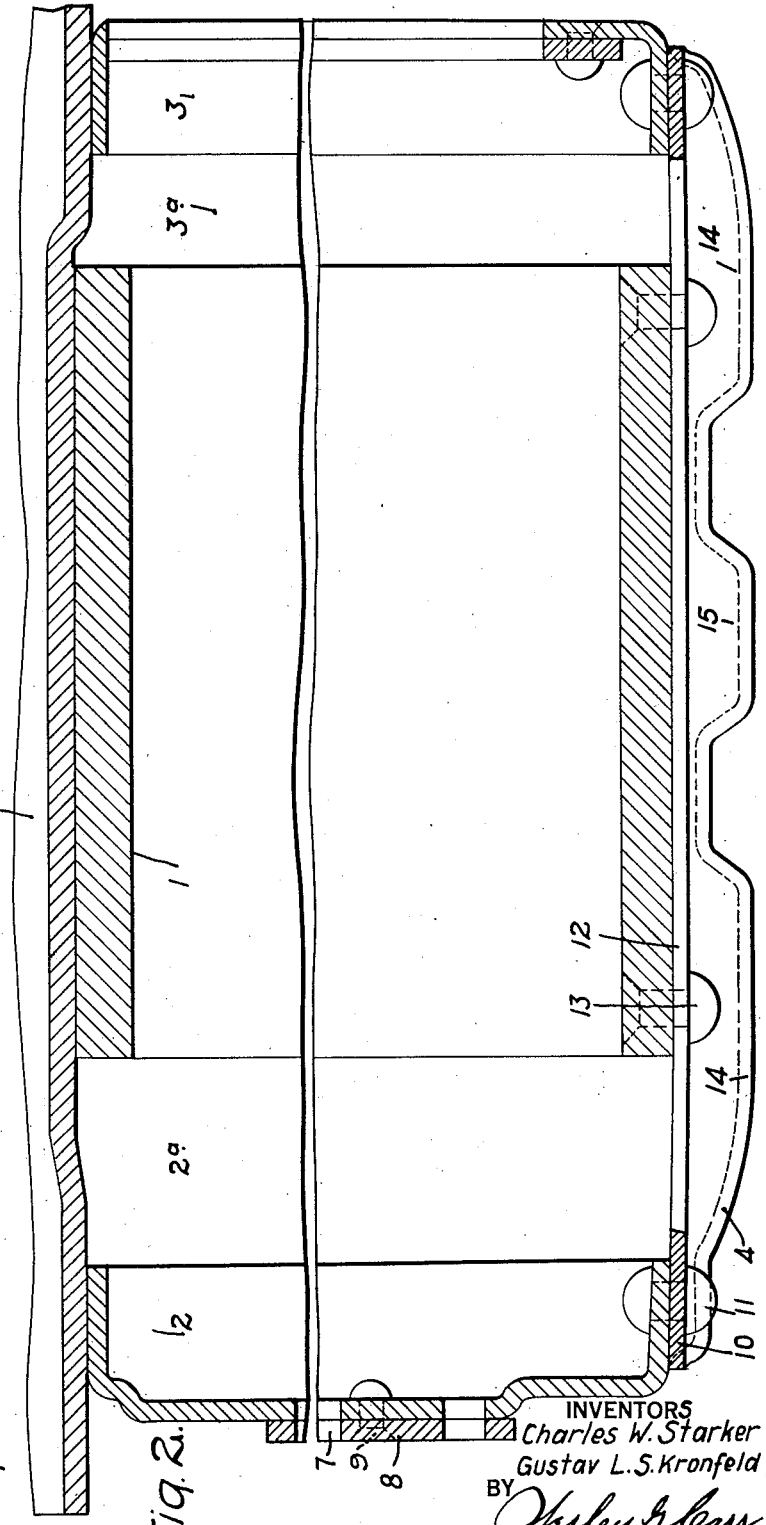

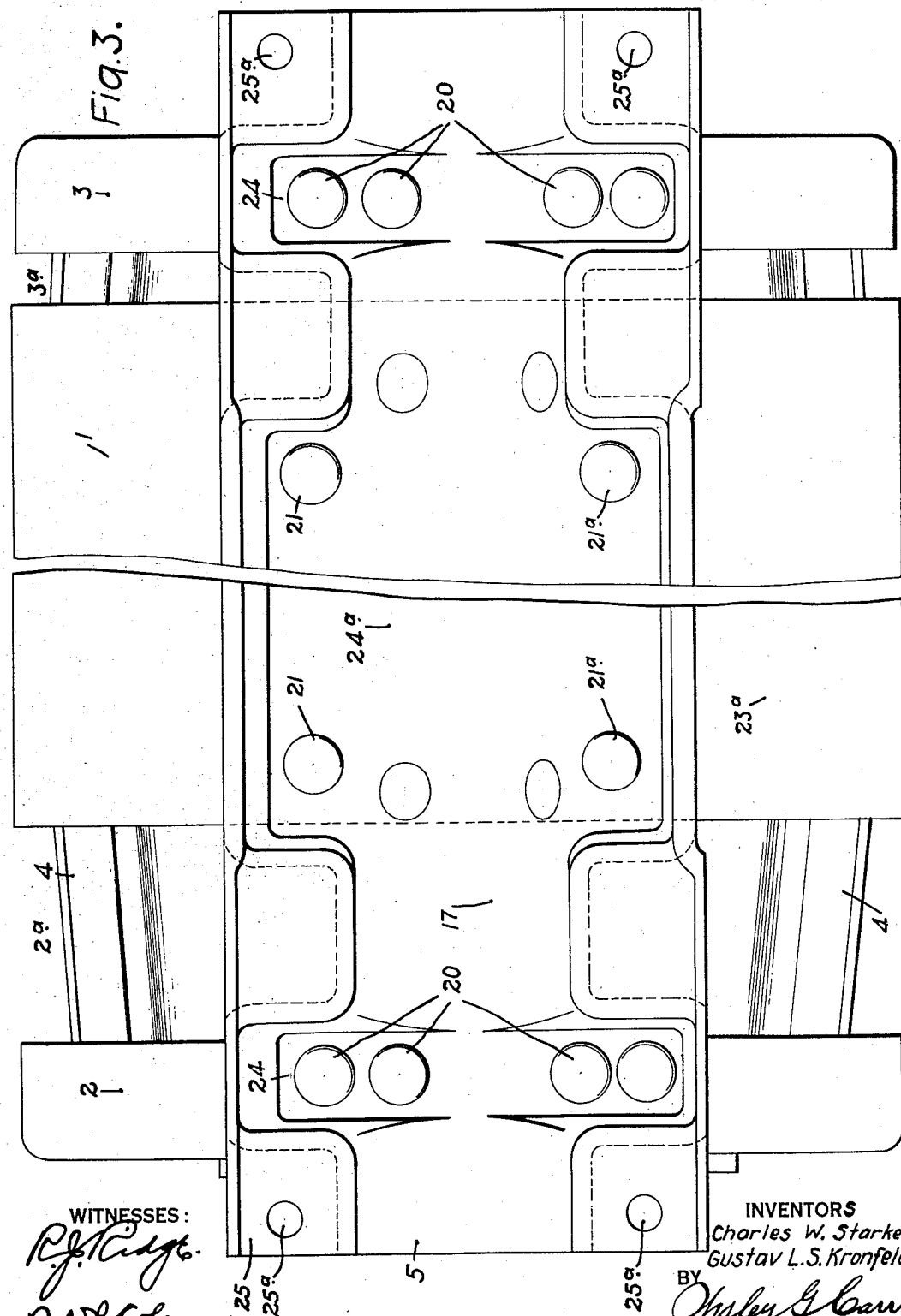

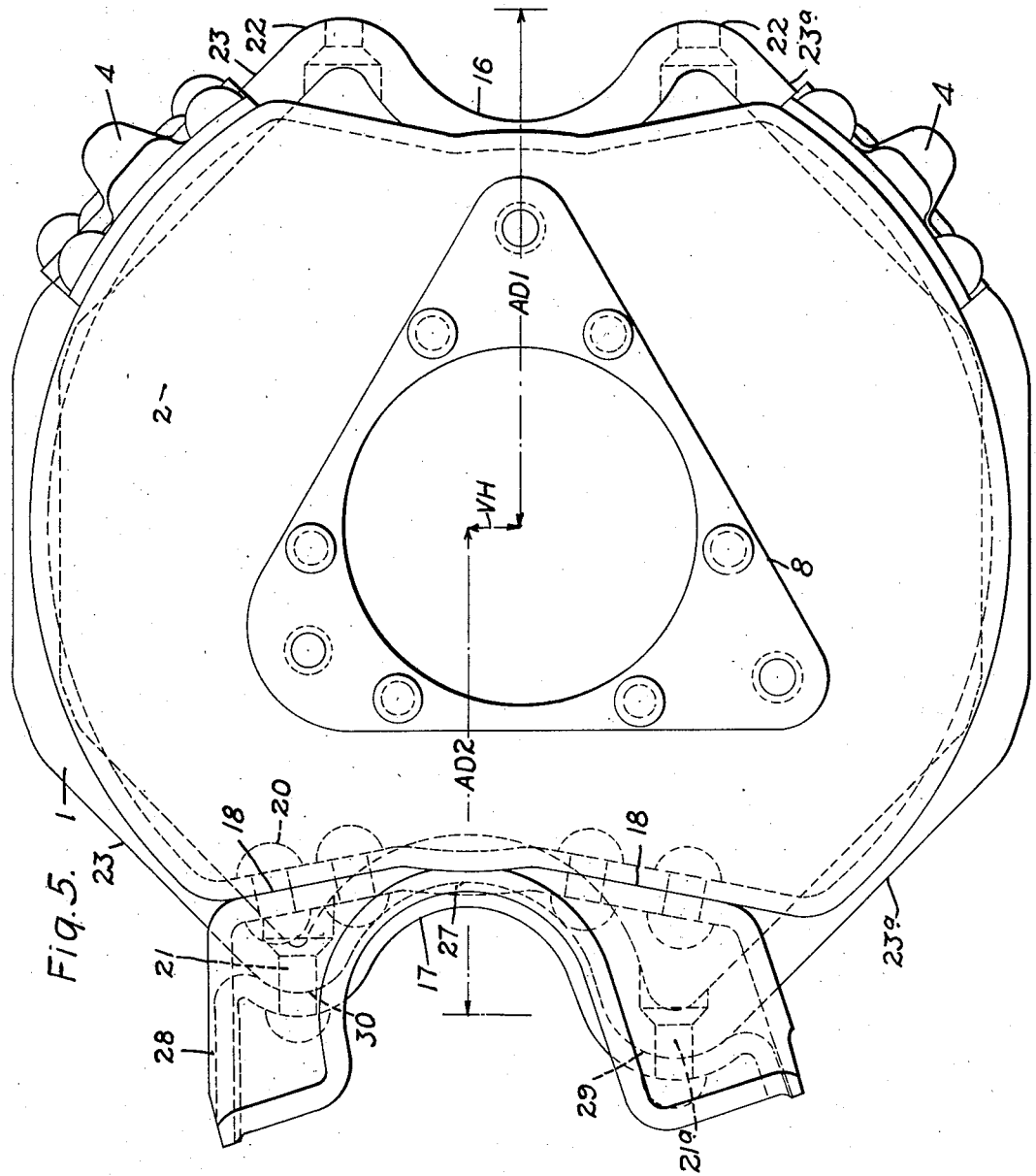

CHARLES W. STARKER, OF PITTSBURGH, AND GUSTAV L. S. KRONFELD, OF WILKINSBURG, PENNSYLVANIA, ASSIGNORS TO WESTINGHOUSE ELECTRIC AND MANUFACTURING COMPANY, A CORPORATION OF PENNSYLVANIA.

DYNAMO-ELECTRIC MACHINE.

1,198,080.  Specification of Letters Patent.  Patented Sept. 12, 1916.

Application filed August 28, 1915. Serial No. 47,881.

*To all whom it may concern:*

Be it known that we, CHARLES W. STARKER, a subject of the Emperor of Germany, and a resident of Pittsburgh, in the county of Allegheny and State of Pennsylvania, and GUSTAV L. S. KRONFELD, a subject of the King of Great Britain, and a resident of Wilkinsburg, in the county of Allegheny and State of Pennsylvania, have invented a new and useful Improvement in Dynamo-Electric Machines, of which the following is a specification.

Our invention relates to dynamo-electric machines and it has special reference to the construction of stator frames therefor.

The object of our invention is to provide a structure of the above-indicated character which shall be relatively light in weight and simple and inexpensive in construction without impairing the desirable mechanical and electrical characteristics or properties of the machine.

We accomplish the end in view by eliminating all parts that are unnecessary for either mechanical or electrical reasons, and we thus obtain the ultimate weight reduction while providing sufficient magnetizable material to constitute a suitable magnetic circuit and to secure the necessary strength and ruggedness of parts. Wherever practicable, we have employed pressed-steel parts to secure maximum strength for minimum weight, as hereinafter more fully set forth.

In the accompanying drawings, Figure 1 is a view in end elevation of a dynamo-electric machine frame constructed in accordance with our invention; Fig. 2 is a view in longitudinal section taken on the line II—II of Fig. 1; Fig. 3 is a view in side elevation taken looking in the direction of the line III—O of Fig. 1; Fig. 4 is a plan view of a portion of the structure illustrated in Fig. 1, the view being taken in the direction of the line IV—O; and Fig. 5 is a view in end elevation of a modification of the structure that is illustrated in Fig. 1.

Referring to the drawings, the structure shown comprises a suitable main magnetizable yoke member 1, here shown as being polygonal in form; a plurality of end-members or end-bells 2 and 3 that are severally spaced from the ends of the yoke member 1 by suitable spaces or openings 2ª and 3ª, a plurality of connecting members or tie-pieces 4 for partially securing the parts 1, 2 and 3 together; an axle bracket 5 that is disposed upon one side of the yoke member 1; and a suspension bar 6 that is disposed upon the opposite side of the yoke member.

The yoke member 1 is adapted to constitute the main magnetic circuit of the machine and, consequently, is preferably formed of rolled steel or other material of suitably high permeability, and is adapted to suitably receive a plurality of pole-pieces or polar projections (not shown) in accordance with customary practice.

The end-bells 2 and 3 are severally provided with centrally-disposed circular openings 7 that are adapted to receive bearing-housings of ordinary construction, and the edges of the openings are reinforced by suitable triangular or otherwise shaped plate members 8 that are secured to the corresponding end-bell by means of a plurality of suitable rivets 9.

The tie-pieces 4 have their ends severally provided with substantially flat pieces 10 that are secured to the respective end-bells 2 and 3 through the agency of a plurality of rivets 11, and the intermediate portions of the tie-pieces are provided with substantially flat side members 12 that are secured to the yoke member 1 by a plurality of rivets 13. For the purpose of obtaining the necessary stiffness of the tie-pieces 4, they are severally provided with suitable pressed-out bosses or ribs 14 near the respective ends of the tie-pieces and with a smaller boss 15 intermediate the bosses 14, thereby securing a maximum of resistance to deformation with a relatively light-weight member.

The axle bracket 5 is adapted to engage a surface depression 16 in one side of the yoke member 1, and is provided with an inner surface 17 that is substantially concentric with the depression 16 for the purpose of receiving the brasses for supporting the axle, in accordance with familiar practice. The inner side of the axle bracket is provided near its respective ends with sloping flat surfaces 18 and 19 that are adapted to abut against complementary surfaces of the corresponding end-bell, to which the axle bracket is secured by means of a plurality of rivets 20. A second set of rivets 21 severally extend through a curved portion of the axle bracket 5 that fits over a correspondingly curved portion 22 of the yoke member 1 that is located between the depression 16 and the upwardly-inclined outer surface 23 of the yoke member. Another set of rivets 21$^a$ is correspondingly located intermediate the depression 16 and the downwardly-inclined outer surface 23$^a$ of the yoke member.

It will be noticed by reference to Fig. 3 and Fig. 4, that the rivets 20 are disposed within suitable pockets 24 of the axle bracket, the material being pressed into such shape that the pockets 24 are provided near the ends of the axle bracket and a relatively large central pocket 24$^a$, within which the rivets 21 and 21$^a$ are disposed, has a length substantially equal to the width of the yoke member 1. The formation of the axle bracket 5 forms no material part of our present invention and it is believed that no further description thereof will be necessary here, inasmuch as the essential features of the construction thereof will be familiar to those skilled in the art. The outer flat surfaces 25 of the axle bracket are provided with suitable bolt openings 25$^a$ for the purpose of engaging a suitable axle cap (not shown) to complete the axle-receiving inclosure, as will be understood. The suspension bar 6 may be of any suitable and usual type and is secured to the yoke member 1 by a plurality of rivets 26 and to the end-bells 2 and 3 by suitable rivets 26$^a$. If desired, the suspension bar 6 may be omitted, and the ends of the tie-pieces 4 suitably shaped to support the machine. The structure shown thus comprises a centrally-disposed yoke member of suitable dimensions to constitute the main magnetic circuit of the machine, a pair of end-bells severally spaced therefrom and adapted to receive and support a pair of bearing-housings, a pair of tie-pieces that are secured to the yoke member 1 and to the end-bells 2 and 3, and in addition, the axle bracket 5 and the suspension bar 6, from which the tie-pieces 4 are suitably spaced, the axle bracket and suspension bar being severally adapted to act also as tie-pieces or connecting members for the machine frame, as well as performing their usual well-understood functions. In this way, we secure a dynamo-electric machine frame that is particularly light in weight, simple and inexpensive in construction and readily adaptable to all sizes of machines. Moreover, the weight reduction has been accomplished without sacrificing the electrical characteristics or the desirable mechanical properties of the machine frame. It will be understood that, if desired, the end-bells 2 and 3, which have the central openings 7 for receiving bearing-housings, may be replaced by the bearing-housings themselves if the latter are provided with suitably extended flanges or side members that are adapted to be secured to the tie pieces 4, the axle bracket 5, and the suspension bar 6. If it is desired to cover the openings 2$^a$ and 3$^a$ for the purpose of excluding dust or moisture from the interior of the machine, these openings may be closed by suitable covers (not shown), preferably of sheet steel, whereby the desired result may be obtained, without adding much weight to the machine frame. In the case of ventilated motors, wherein the rear end of the armature is provided with a suitable fan member, the covers above the fan will preferably have suitable punched or other openings to permit passage of the ventilating air.

Reference may now be had to Fig. 5, which illustrates a dynamo-electric machine frame having a surface depression 27 that is located on the opposite side of the yoke member 1 from the hereinbefore-described depression 16 with which the frame is also provided. However, in the case shown, the distance AD/1 between the central axis of the frame and the axial center of the axle-receiving inclosure 16 is greater than the corresponding dimension AD/2 between the central axis of the frame and the axial center of the depression 27. Moreover, the axial center of the depression 27 is disposed a distance VH above the axial center of the depression 16, with respect to the outer bottom surface of the yoke member 1. In this way, the same yoke member and end-bells may be employed in a plurality of machines of different capacities and characteristics, whereby the total cost of manufacture of a complete series of machine frames may be materially reduced. For example, since the axle center distance AD/2 is less than the corresponding dimension AD/1, by disposing a suitable axle bracket 28 within the depression 27 of the yoke member, an entirely different set of gears and pinions may be employed, whereby the machine is readily adapted for different classes of service and, as will be understood, a machine having the decreased axle center distance AD/2 may be employed in some cases within the small space usually available beneath the floors of modern railway vehicles, whereas with an axle center distance AD/1, for instance, it might be impossible to employ a machine of the desired capacity. Moreover, the clearance distance between the roadbed and the bottom surface of the machine frame is sometimes a matter of importance and, by the provision of the two axle-bracket-receiving depressions 16 and 27, the clearance distance may be varied by the dimension VH, such clearance being decreased by the use of the depression 27 that is illustrated. However, it will be appreciated that by shifting the position of the axial center line of the axle-bracket-receiving inclosure, the radii of the curved portions of the frame that are disposed intermediate the depression 27 and the corresponding inclined flat surfaces 23 and 23ª of the yoke member will vary from the equal radii of the corresponding curved portions 22 of the yoke member that are associated with the depression 16. For example, as shown in Fig. 5, the curved portion 29 of the lower part of the frame has a considerably greater radius than the curved portion 30 of the upper part of the frame, while the similar curved portions 22 on the opposite side of the frame respectively have radii of a length intermediate the radii of the curves 29 and 30. Consequently, although the flat surfaces 18 of the axle bracket 28 may be formed substantially identical with the corresponding surfaces of the axle bracket 5, the curved portions of the bracket 28 that engage the curved portions 29 and 30 of the frame will be of different form from the corresponding curved portions 22 of the axle bracket 5. As a result, each different displacement of the axial center line of the depression 27 will necessitate a different axle bracket, with the consequent additional cost of manufacture, provided that it is desired to effect a direct engagement of the curved portions 29 and 30 of the yoke member with the corresponding portions of the axle bracket 28. However, this additional expense may be avoided in the following manner: If the curved portion of the axle bracket 28 that engages the curved portion 29 of the yoke member, has an inner radius that is equal to the largest radius of the curved portion 29 upon which it is desired to fit the bracket, and if the other curved portion of the axle bracket that is here shown as engaging the curved portion 30 of the yoke member, has a radius equal to the largest radius of the curved portion 30 of the yoke member that it will be called upon to engage, then by the provision of spacers or shims of a suitable form, the same axle bracket may be employed in connection with a plurality of differently located depressions 27. For example, in Fig. 5, assuming that the curved portion of the axle bracket 28 that engages the curved portion 29 has a radius equal to that of the portion 29 and that the curved portion of the axle bracket that now engages the curved portion 30 of the yoke member has a radius equal to that of the curved portion 22 of the yoke member, then by providing a suitable shim having the radius of its outer surface equal to that of the curved portion 22 and the radius of its inner surface equal to the radius of the curved portion 30, the curved portion of the axle bracket 28 that now engages the curved portion 30 of the yoke member would directly engage the outer surface of the shim and a suitably secured fastening of the axle bracket to the yoke member 1 would be effected. On the other hand, if the axle bracket 28 were then placed within the depression 16 on the other side of the frame, the curved portion of the bracket that now engages the curved portion 30 of the yoke member would exactly fit over the curved portion 22 of the yoke member, while by the provision of a suitable shim having the radius of its outer surface equal to that of the curved portion 29 of the yoke member and the radius of its inner surface equal to the radius of the curved portion 22 of the yoke member, then again a snug and secure fit of the axle bracket 28 to the yoke member 1 would be effected. Moreover, by varying the radius of the depression 27, the same axle-center distance as that of the other depression 16 may be obtained in conjunction with the use of an axle having a different diameter from that otherwise employed, as will be understood.

While the explanation just given is applicable directly to the case shown in Fig. 5, only, it will be noted that, by a suitable formation of the curved portions under consideration of the axle bracket 28 and by the provision of a suitable set of shims to meet the desired conditions, one axle bracket 28 may be employed in connection with any desired displacement of the axial center line of the depression 27. It should also be observed that in the structure illustrated in Fig. 5, the end-bells are each provided with a single axle-bracket-receiving depression that is formed by the flat surfaces 18, whereby the same end-bells may be employed in connection with either the axle bracket 5 or the axle bracket 28 by suitable rotative disposition of the end-bells, or substantially 180° in the case shown.

We do not wish to be restricted to the specific structural details or arrangement of parts herein set forth, as various modifications thereof may be made without departing from the spirit or scope of our invention. We desire, therefore, that only such limitations shall be imposed as are indicated in the appended claims.

We claim as our invention:

1. A dynamo-electric machine frame comprising a main magnetizable yoke member, a plurality of end-members severally spaced therefrom, and a plurality of relatively light-weight connecting members severally secured to said yoke member and said end members.

2. A dynamo-electric machine frame comprising a main magnetizable yoke member of suitably large dimensions to constitute the main magnetic circuit of the machine, a plurality of pressed-metal end-bells of relatively light weight severally spaced therefrom, and a plurality of relatively light-weight pressed-metal connecting members severally secured to said yoke member and said end-bells.

3. A dynamo-electric machine frame comprising a magnetizable yoke member of suitably large dimensions to constitute the main magnetic circuit of the machine, a plurality of pressed-metal end-bells of relatively light-weight severally spaced therefrom, a plurality of relatively light-weight pressed-steel tie-pieces having stiffening bosses formed therein, and means for securing said tie-pieces to said yoke member and to said end-bells.

4. A dynamo-electric machine frame comprising a magnetizable yoke member, a plurality of end-members severally spaced therefrom, and an axle bracket secured to said yoke member and said end-members to aid in connecting them.

5. A dynamo-electric machine frame comprising a magnetizable yoke member, a plurality of end-members severally spaced therefrom, and a plurality of connecting members and an axle bracket severally secured to said yoke member and said end-members.

6. A dynamo-electric machine frame comprising a magnetizable yoke member, a plurality of end-bells spaced therefrom, and an axle bracket, a suspension bar and a connecting member severally secured to said yoke member and said end-bells.

7. A dynamo-electric machine frame comprising a magnetizable yoke member of suitably large dimensions to constitute the main magnetic circuit of the machine, a plurality of pressed-metal end-bells of relatively light-weight severally spaced therefrom, and a plurality of relatively light-weight pressed-metal connecting members, a pressed-metal axle bracket and a suspension bar suitably spaced the one from the other and severally secured to said yoke member and said end-bells.

8. A dynamo-electric machine frame having a plurality of surface depressions severally adapted to receive axle brackets, said depressions being unsymmetrically located with respect to the central axis of the frame, whereby machines of different axle-center distances or axle diameters may employ the same frame.

9. A dynamo-electric machine frame having a plurality of oppositely-disposed surface depressions severally adapted to receive axle brackets, said depressions being located different distances from the central axis of the frame.

10. A dynamo-electric machine frame comprising a main magnetizable yoke member having a plurality of unsymmetrically located surface depressions, an axle bracket associated with one or the other of said depressions in accordance with predetermined conditions, and a plurality of end-bells each having a single axle-bracket-receiving depression, whereby the same end-bells may be employed in connection with either axle-bracket location by suitable rotative disposition of the end-bells.

11. A dynamo-electric machine frame comprising a main magnetizable yoke member having a plurality of unsymmetrically located surface depressions on opposite sides of said yoke member, an axle bracket associated with one or the other of said depressions in accordance with service conditions, and a plurality of end-bells each having a single axle-bracket-receiving side depression, whereby the same end-bells may be employed in connection with either axle-bracket location by turning the end-bells substantially 180°.

In testimony whereof, we have hereunto subscribed our names this 24th day of Aug., 1915.

CHARLES W. STARKER.
GUSTAV L. S. KRONFELD.